(12) United States Patent
Trombley (10) Patent No.: US 11,885,630 B2
(45) Date of Patent: Jan. 30, 2024

(54) SYSTEM AND METHOD FOR SIMULATION OF OUTCOMES FOR USE IN NAVIGATING PROCEDURES FOR RESOURCE ACQUISITION

(71) Applicant: BANK OF AMERICA CORPORATION, Charlotte, NC (US)

(72) Inventor: Kathleen Hanko Trombley, Oakboro, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 449 days.

(21) Appl. No.: 17/341,681

(22) Filed: Jun. 8, 2021

(65) Prior Publication Data
US 2022/0390246 A1     Dec. 8, 2022

(51) Int. Cl.
*G01C 21/34*     (2006.01)
*G01C 21/36*     (2006.01)
*G06N 5/04*      (2023.01)

(52) U.S. Cl.
CPC ..... *G01C 21/3484* (2013.01); *G01C 21/3626* (2013.01); *G06N 5/04* (2013.01)

(58) Field of Classification Search
CPC .... G06Q 40/00; G06Q 10/06; G01C 21/3484; G01C 21/3626; G06N 5/04
See application file for complete search history.

(56) References Cited

U.S. PATENT DOCUMENTS

| 10,345,112 | B2 * | 7/2019 | Narasimhan | ........... G01C 21/20 |
| 11,054,270 | B1 * | 7/2021 | Singh | ............... G08G 1/096888 |
| 2020/0252347 | A1 * | 8/2020 | Dintenfass | ......... G06Q 30/0202 |

* cited by examiner

*Primary Examiner* — Scott S Trotter
(74) *Attorney, Agent, or Firm* — Moore & Van Allen PLLC; Nicholas C. Russell (57) ABSTRACT

Embodiments of the present invention provide a system for simulating outcomes for use in navigating procedures for resource acquisition. The system is configured for identifying initiation of at least one event by a user via an entity application, wherein the at least one event is associated with acquisition of a first resource, in response to identifying initiation of the at least one event, extracting user data associated with the user, identifying one or more procedures associated with the acquisition of the first resource, compiling the user data and the one or more procedures to generate one or more navigational recommendations associated with the acquisition of the first resource, transmitting the one or more navigational recommendations to a user device of the user, and transmitting a set of control signals to display the one or more navigational recommendations on a graphical user interface of the user device, via the entity application.

20 Claims, 5 Drawing Sheets

SYSTEM AND METHOD FOR SIMULATION OF OUTCOMES FOR USE IN NAVIGATING PROCEDURES FOR RESOURCE ACQUISITION

BACKGROUND

Conventional systems do not have the capability to compile and predict outcomes associated with consequences of resources acquisition. As such, there exists a need for a system that can effectively compile data and simulate outcomes for use in navigating procedures for resource acquisition.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for simulating outcomes for use in navigating procedures for resource acquisition. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies initiation of at least one event by a user via an entity application, wherein the at least one event is associated with acquisition of a first resource, in response to identifying initiation of the at least one event, extracts user data associated with the user, identifies one or more procedures associated with the acquisition of the first resource, compiles the user data and the one or more procedures to generate one or more navigational recommendations associated with the acquisition of the first resource, transmits the one or more navigational recommendations to a user device of the user, and transmits a set of control signals to display the one or more navigational recommendations on a graphical user interface of the user device, via the entity application.

In some embodiments, the present invention identifies initiation of at least one other event by the user via the entity application, wherein the at least one other event is associated with acquisition of a second resource.

In some embodiments, the present invention in response to identifying the initiation of the at least one other event, extracts resource acquisition data associated with the second resource and one or more procedures associated with the acquisition of the second resource and simulates acquisition of the second resource and generate an outcome based on the user data, resource acquisition data associated with the second resource, and the one or more procedures associated with the acquisition of the second resource.

In some embodiments, the outcome provides information associated with the impact of the acquisition of the second resource on the acquisition of the first resource.

In some embodiments, the present invention transmits the outcome to the user device and transmits a second set of control signals to display the outcome on the graphical user interface of the first device.

In some embodiments, the present invention displays the outcome via one or more graphical means.

In some embodiments, the present invention extracts resource acquisition data associated with the acquisition of the first resource from one or more third party entities.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that processes financial transactions including, but not limited to, banks, credit unions, savings and loan associations, investment companies, stock brokerages, fund management firms, insurance companies and the like. In accordance with embodiments of the invention, the terms "third party system" and "other third party systems" may include any organizations including, but not limited to, photo identification issuing agencies, network managing organizations, email managing organizations, and/or the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

In accordance with embodiments of the invention, a "resource pool" or an "account" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user data-file that includes information associated with the user, or the like. The account is associated with and/or maintained by the entity.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Conventional systems do not have the capability to provide information associated with navigational procedures associated with acquisition of resources based on user data available in entity systems. As such, there exists a need for a system that can simulate outcomes of real-time decisions that may or may not impact the acquisition of resources. The system of the present invention simulates one or more outcomes associated with real-time scenarios and provides recommendations associated with navigation procedures for acquisition of resources based on the one or more outcomes.

Figure 1:
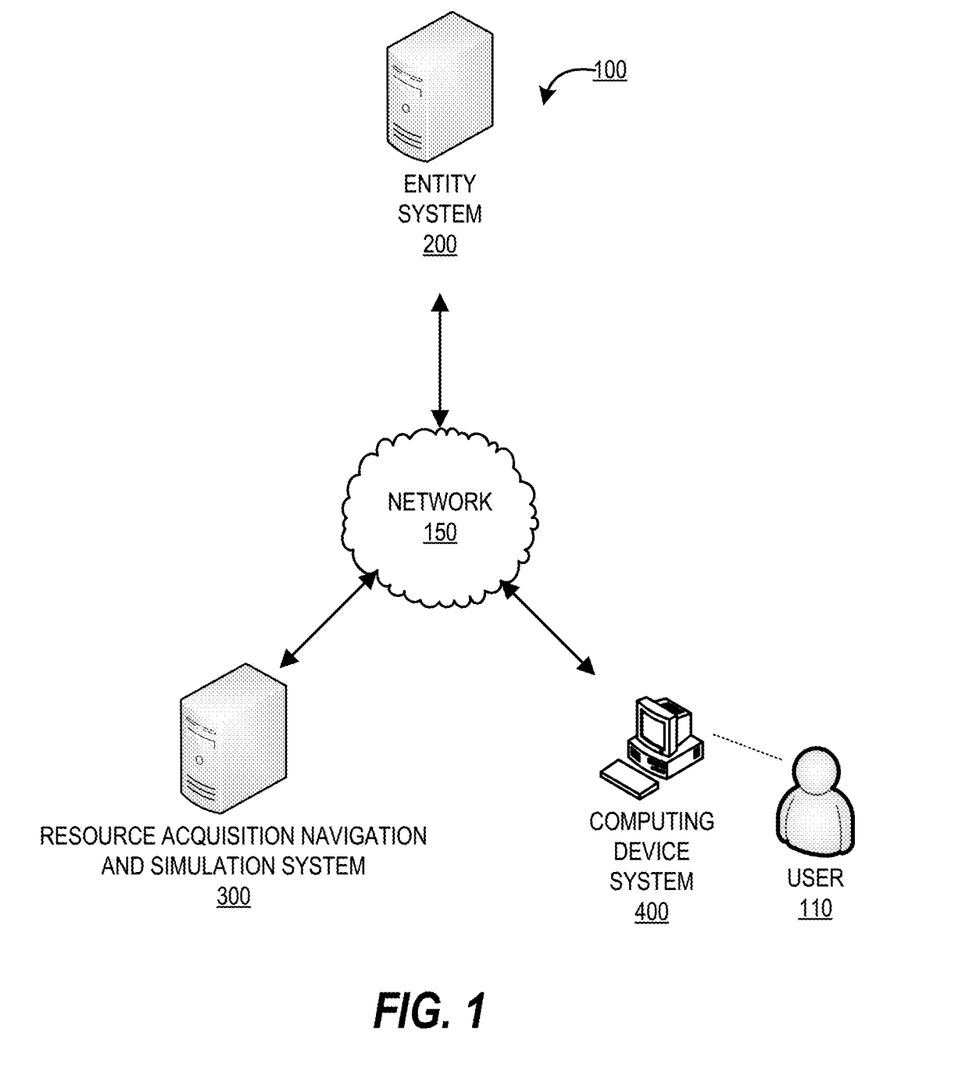
FIG. 1 provides a block diagram illustrating a system environment for simulating outcomes for use in navigating procedures for resource acquisition, in accordance with an embodiment of the invention.

FIG. 1 provides a block diagram illustrating a system environment 100 for simulating outcomes for use in navigating procedures for resource acquisition, in accordance with an embodiment of the invention. As illustrated in FIG. 1, the environment 100 includes a resource acquisition navigation and simulation system 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more user(s) 110 of the system environment 100 may be potential customers of the entity.

The entity system(s) 200 may be any system owned or otherwise controlled by an entity to support or perform one or more process steps described herein. In some embodiments, the entity is a financial institution. In some embodiments, the entity is a non-financial institution that facilitates planning services associated with acquisition of resources.

The resource acquisition navigation and simulation system 300 is a system of the present invention for performing one or more process steps described herein. In some embodiments, the resource acquisition navigation and simulation system 300 may be an independent system. In some embodiments, the resource acquisition navigation and simulation system 300 may be a part of the entity system 200.

The resource acquisition navigation and simulation system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the resource acquisition navigation and simulation system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the resource acquisition navigation and simulation system 300, and/or entity system 200 across the network 150.

Figure 2:
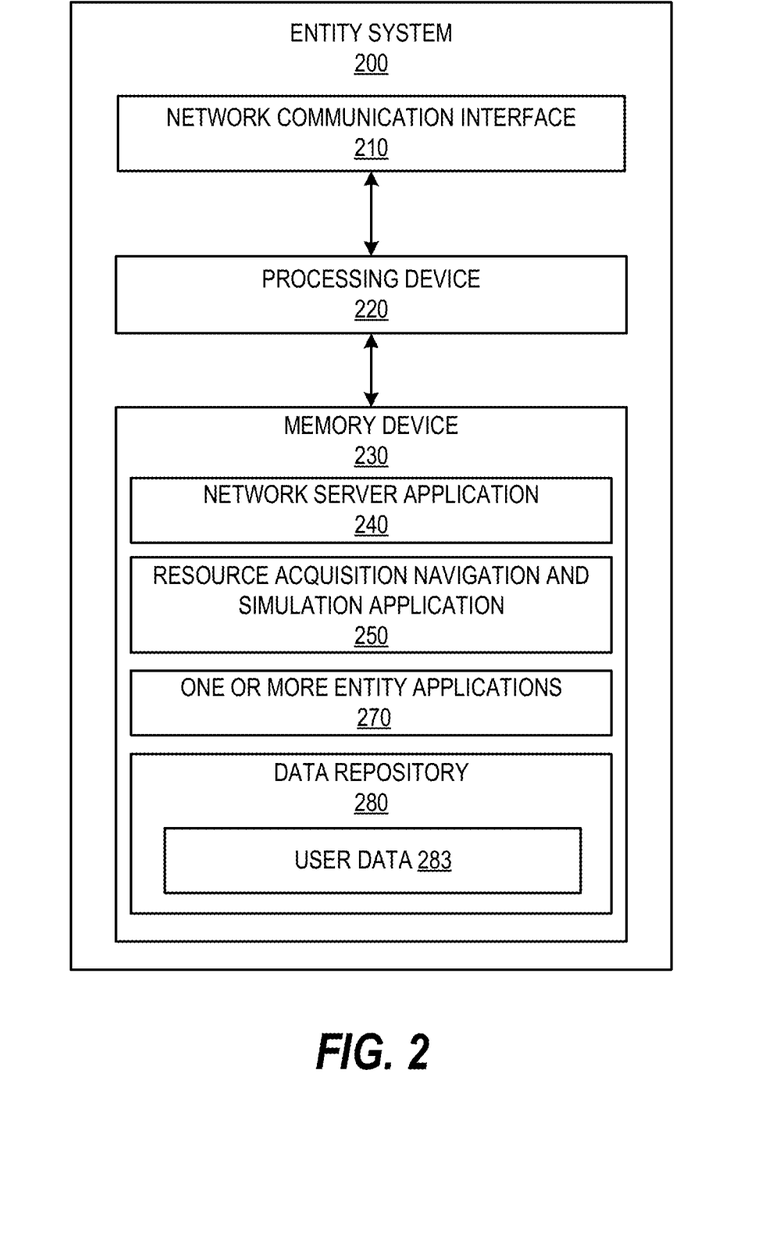
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a resource acquisition navigation and simulation application 250, one or more entity applications 270, and a data repository 280 comprising information associated with user data 2803. The one or more entity applications 270 may be any applications developed, supported, maintained, utilized, and/or controlled by the entity. User data 2803 may comprise any data associated with the one or more users of the entity (e.g., resource pool information, historical interaction data, historical saving data, user remuneration data, or the like). The computer-executable program code of the network server application 240, the resource acquisition navigation and simulation application 250, the one or more entity application 270 to perform certain logic, data-extraction, and data-storing functions of the entity system 200 described herein, as well as communication functions of the entity system 200.

The network server application 240, the resource acquisition navigation and simulation application 250, and the one or more entity applications 270 are configured to store data in the data repository 280 or to use the data stored in the data repository 280 when communicating through the network communication interface 210 with the resource acquisition navigation and simulation system 300, and/or the computing device system 400 to perform one or more process steps described herein. In some embodiments, the entity system 200 may receive instructions from the resource acquisition navigation and simulation system 300 via the resource acquisition navigation and simulation application 250 to perform certain operations. The resource acquisition navigation and simulation application 250 may be provided by the resource acquisition navigation and simulation system 300. The one or more entity applications 270 may be any of the applications used, created, modified, facilitated, and/or managed by the entity system 200.

Figure 3:
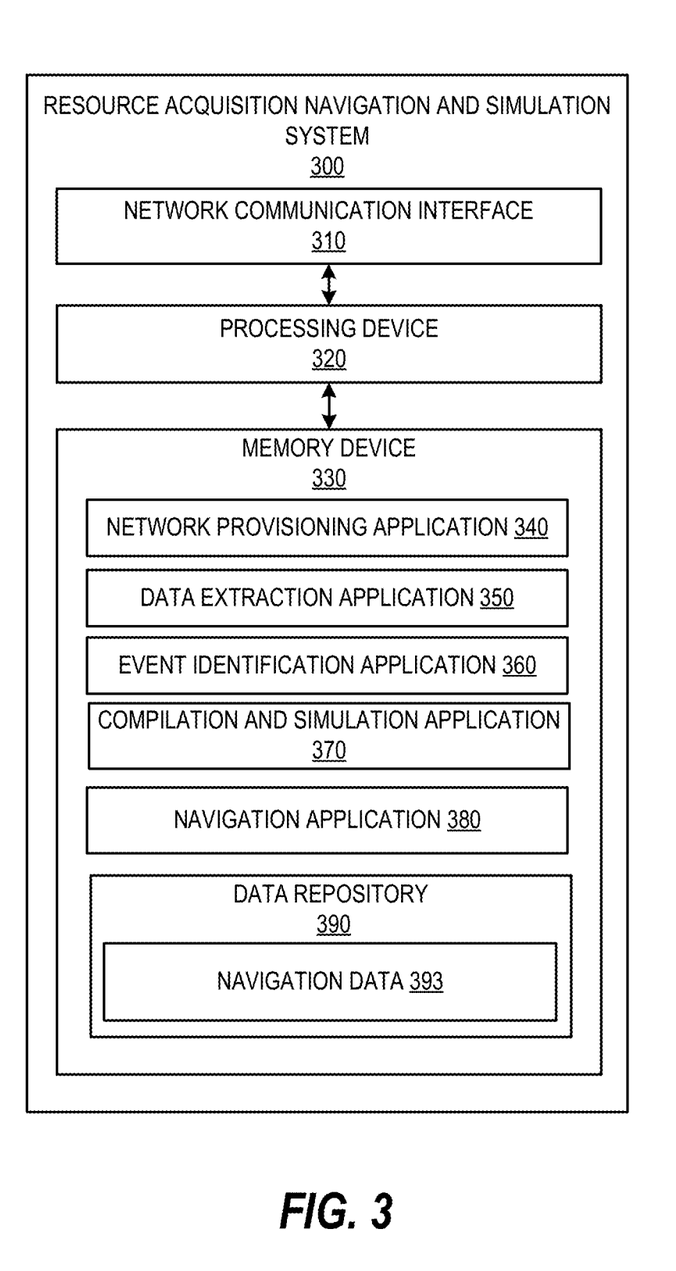
FIG. 3 provides a block diagram illustrating a resource acquisition navigation and simulation system 300 of FIG. 1, in accordance with an embodiment of the invention.

FIG. 3 provides a block diagram illustrating the resource acquisition navigation and simulation system 300 in greater detail, in accordance with embodiments of the invention. As illustrated in FIG. 3, in one embodiment of the invention, the resource acquisition navigation and simulation system 300 includes one or more processing devices 320 operatively coupled to a network communication interface 310 and a memory device 330. In certain embodiments, the resource acquisition navigation and simulation system 300 is operated by an entity, such as a financial institution. In some embodiments, the resource acquisition navigation and simulation system 300 is owned or operated by the entity of the entity system 200. In some embodiments, the resource acquisition navigation and simulation system 300 may be an independent system. In alternate embodiments, the resource acquisition navigation and simulation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the resource acquisition navigation and simulation system 300 described herein. For example, in one embodiment of the resource acquisition navigation and simulation system 300, the memory device 330 includes, but is not limited to, a network provisioning application 340, a data extraction application 350, an event identification application 360, a compilation and simulation application 370, a navigation application 380, and a data repository 390 comprising navigation data 393 and any other data processed or accessed by one or more applications in the memory device 330. The computer-executable program code of the network provisioning application 340, the data extraction application 350, the event identification application 360, the compilation and simulation application 370, and the navigation application 380 may instruct the processing device 320 to perform certain logic, data-processing, and data-storing functions of the resource acquisition navigation and simulation system 300 described herein, as well as communication functions of the resource acquisition navigation and simulation system 300.

The network provisioning application 340, the data extraction application 350, the event identification application 360, the compilation and simulation application 370, and the navigation application 380 are configured to invoke or use the data in the data repository 390 when communicating through the network communication interface 310 with the entity system 200, and/or the computing device system 400. In some embodiments, the network provisioning application 340, the data extraction application 350, the event identification application 360, the compilation and simulation application 370, and the navigation application 380 may store the data extracted or received from the entity system 200, and the computing device system 400 in the data repository 390. In some embodiments, the network provisioning application 340, the data extraction application 350, the event identification application 360, the compilation and simulation application 370, and the navigation application 380 may be a part of a single application. The functionalities of the network provisioning application 340, the data extraction application 350, the event identification application 360, the compilation and simulation application 370, and the navigation application 380 are explained in greater detail in FIG. 5.

Figure 4:
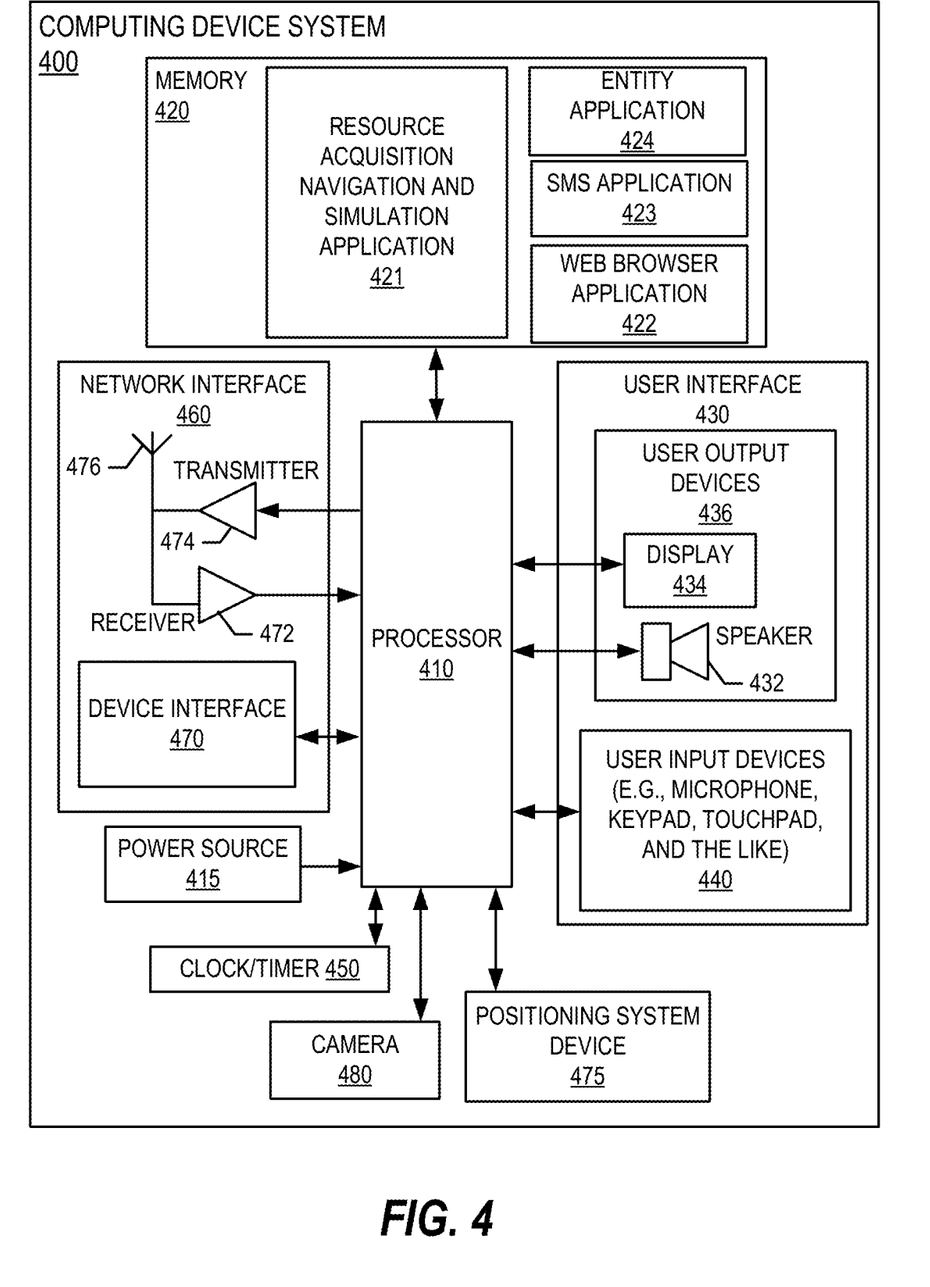
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a resource acquisition navigation and simulation application 421, entity application 424. These applications also typically instructions to a graphical user interface (GUI) on the display 430 that allows the user 110 to interact with the entity system 200, the resource acquisition navigation and simulation system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the resource acquisition navigation and simulation application 421 provided by the resource acquisition navigation and simulation system 300 allows the user 110 to access the resource acquisition navigation and simulation system 300. In some embodiments, the entity application 424 provided by the entity system 200 and the resource acquisition navigation and simulation application 421 allow the user 110 to access the functionalities provided by the resource acquisition navigation and simulation system 300 and the entity system 200. In some embodiments, the entity application 424 may be an online banking application provided by the entity to the one or more users 110.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
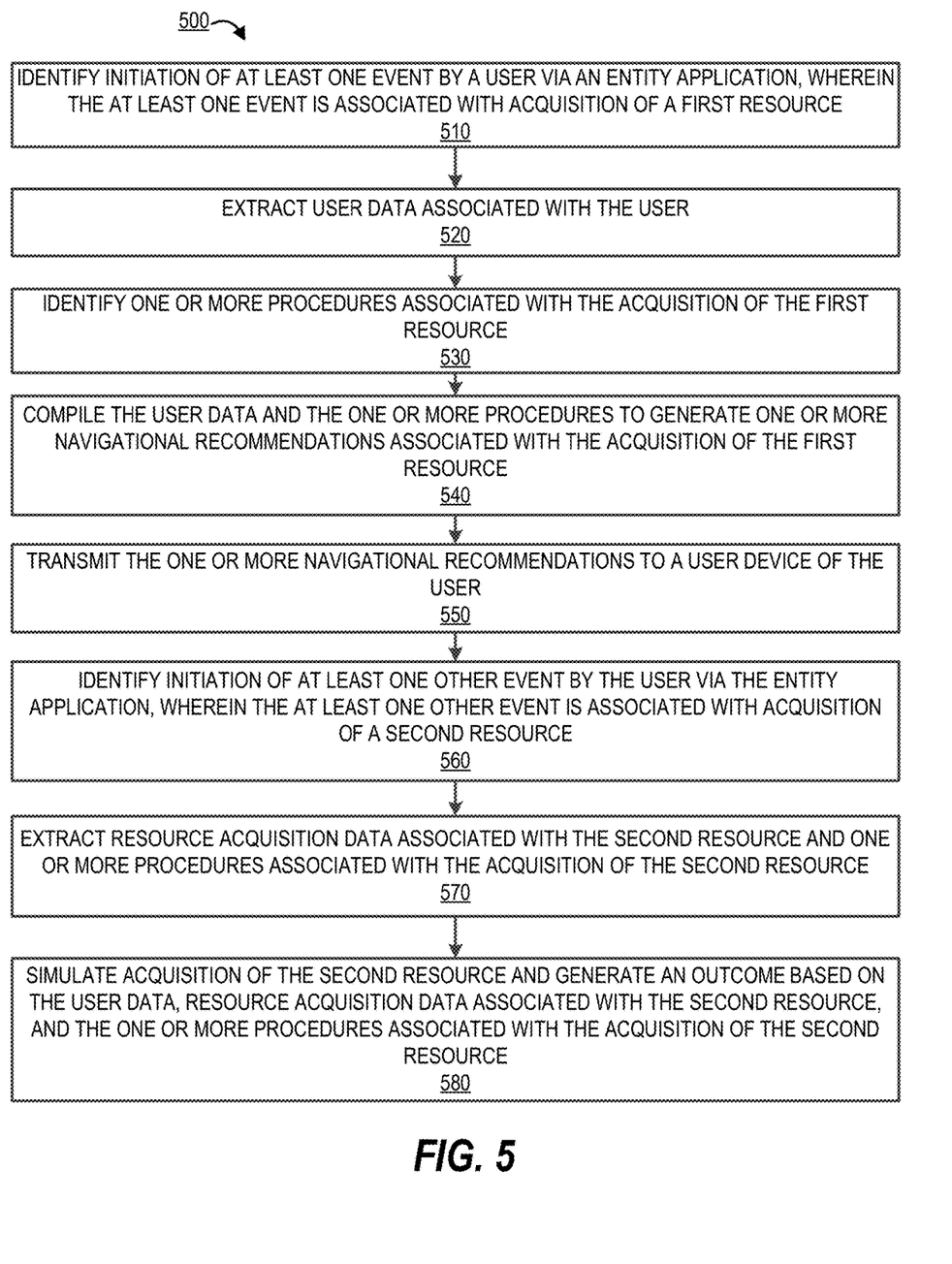
FIG. 5 provides a flowchart illustrating a process flow for simulating outcomes for use in navigating procedures for resource acquisition, in accordance with an embodiment of the invention.

FIG. 5 provides a flowchart illustrating a process flow for simulating outcomes for use in navigating procedures for resource acquisition, in accordance with an embodiment of the invention. As shown in block 510, the system identifies initiation of at least one event by a user via an entity application, wherein the at least one event is associated with acquisition of a first resource. The event may be associated with acquisition of the first resource, where the event may be setting up a goal associated with the acquisition of the first resource. For example, the user may access the online banking application and may set up a savings goal for purchase of a house. In some embodiments, the system may automatically identify that the user is planning to purchase a house based on user interaction data, user activity data, and/or user navigation data.

As shown in block 520, the system extracts user data associated with the user. The system may extract user data including, but not limited to, user remuneration information, historical interaction information and savings information associated with one or more resource pools (e.g., credit card, debit card, savings account, checking account, or the like), or the like from the entity system. In some embodiments, the system may extract the user data from a third party system (e.g., credit bureau, or the like).

As shown in block 530, the system identifies one or more procedures associated with the acquisition of the first resource. One or more procedures may be any procedures associated with acquisition of the first resource. Continuing with the previous example, the system may extract credit standing data, home mortgage application procedure, and/or the like. In some embodiments, the system may extract the one or more procedures from one or more third party entities. In some embodiments, in addition to identifying the one or more procedures, the system may identify resource acquisition data associated with the acquisition of the first resource. For example, As shown in block 540, the system compiles the user data and the one or more procedures to generate one or more navigational recommendations associated with the acquisition of the first resource. For example, the system may compile the user savings data, spending data, remuneration data, credit standing data, and home mortgage application procedure, and may provide a recommendation that no transactions over a certain limit should be made a few months prior to the purchase of the house and to maintain a monthly savings goal of a $XX.XX. In some embodiments, the one or more navigational recommendations may be in the form of a map, where each destination/milestone is associated with a navigational recommendation.

As shown in block 550, the system transmits the one or more navigational recommendations to a user device of the user. In some embodiments, the system may also transmit a set of control signals to cause the user device to display the one or more navigational recommendations on the graphical user device, via the entity application. In some embodiments, the one or more navigational recommendations may be displayed via one or more graphical means. In some embodiments, the system may continuously monitor changes to the user data and the one or more procedures. In response to detecting any changes to the user data or the one or more procedures in real-time, the system may automatically update the one or more navigational recommendations in real-time. The system may also transform the graphical user interface of the user device to display the real-time changes.

As shown in block 560, the system identifies initiation of at least one other event by the user via the entity application, wherein the at least one other event is associated with acquisition of a second resource. For example, the system may identify that the user is planning to purchase a car. In some embodiments, the system may identify initiation of the at least one other event based on historical transaction data, location data, and/or user activity data (e.g., website navigation data, or the like).

As shown in block 570, the system extracts resource acquisition data associated with the second resource and one or more procedures associated with the acquisition of the second resource. In some embodiments, the system may extract the resource acquisition data and/or the one or more procedures from one or more third party entities. Continuing with the previous example, the system identifies that a car that the user is planning to purchase costs $Y and that an auto loan may be required to purchase the car and may extract auto loan application procedures and auto loan payment procedures.

As shown in block 580, the system simulates acquisition of the second resource and generates an outcome based on the user data, resource acquisition data associated with the second resource, and the one or more procedures associated with the acquisition of the second resource. Simulation of the acquisition of the second resource provides an insight on how the acquisition of the second resource may or may not impact the acquisition of the first resource. In some embodiments, the system may run one or more simulations based on one or more factors in parallel. For example, the system may run different simulations for purchasing a car from different dealers and purchasing different cars for a variety of price ranges. In another example, the system may run one or more simulations for purchasing the car by using different payment options such as payment of cash in full, partial down payment, and/or the like. In response to running the one or more simulations in parallel, the system may generate an outcome associated with the acquisition of the second resource. For example, the system may generate an outcome that purchase of a car may negatively impact the goal of purchasing a house. In another example, the system may generate an outcome that purchase of the car is not advisable based on the user data. In yet another example, the system may generate an outcome that purchase of a car at a certain dealer and at a certain price range may not impact the goal of purchasing a house. In some embodiments, the system may display the one or more simulations and the one or more outcomes via one or more graphical means. For example, the system may run one or more simulations based on different price ranges of cars and may represent how each of the simulation may impact the home mortgage approval odds. In some embodiments, the system may transform the graphical representations based on detecting real-time changes to the user data, resource acquisition data, and/or the one or more procedures associated with acquisition of the resources.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for simulating outcomes for use in navigating procedures for resource acquisition, the system comprising:
   at least one network communication interface;
   at least one non-transitory storage device; and
   at least one processing device coupled to the at least one non-transitory storage device and the at least one network communication interface, wherein the at least one processing device is configured to:
   identify initiation of at least one event by a user via an entity application, wherein the at least one event is associated with acquisition of a first resource;
   in response to identifying initiation of the at least one event, extract user data associated with the user;
   identify one or more procedures associated with the acquisition of the first resource;
   compile the user data and the one or more procedures to generate one or more navigational recommendations associated with the acquisition of the first resource;
   transmit the one or more navigational recommendations to a user device of the user; and
   transmit a set of control signals to display the one or more navigational recommendations on a graphical user interface of the user device, via the entity application.

2. The system of claim 1, wherein the at least one processing device is configured to:
   identify initiation of at least one other event by the user via the entity application, wherein the at least one other event is associated with acquisition of a second resource.

3. The system of claim 2, wherein the at least one processing device is configured to:

in response to identifying the initiation of the at least one other event, extract resource acquisition data associated with the second resource and one or more procedures associated with the acquisition of the second resource; and simulate acquisition of the second resource and generate an outcome based on the user data, resource acquisition data associated with the second resource, and the one or more procedures associated with the acquisition of the second resource.

4. The system of claim 3, wherein the outcome provides information associated with impact of the acquisition of the second resource on the acquisition of the first resource.

5. The system of claim 3, wherein the at least one processing device is configured to:

transmit the outcome to the user device; and transmit a second set of control signals to display the outcome on the graphical user interface of the user device.

6. The system of claim 5, wherein the at least one processing device is configured to display the outcome via one or more graphical means.

7. The system of claim 1, wherein extracting the one or more procedures further comprises extracting resource acquisition data associated with the acquisition of the first resource from one or more third party entities.

8. A computer program product for simulating outcomes for use in navigating procedures for resource acquisition, the computer program product comprising a non-transitory computer-readable storage medium having computer executable instructions for causing a computer processor to perform the steps of:

identifying initiation of at least one event by a user via an entity application, wherein the at least one event is associated with acquisition of a first resource;

in response to identifying initiation of the at least one event, extracting user data associated with the user;

identifying one or more procedures associated with the acquisition of the first resource;

compiling the user data and the one or more procedures to generate one or more navigational recommendations associated with the acquisition of the first resource;

transmitting the one or more navigational recommendations to a user device of the user; and transmitting a set of control signals to display the one or more navigational recommendations on a graphical user interface of the user device, via the entity application.

9. The computer program product of claim 8, wherein the computer executable instructions cause the computer processor to perform the steps of identifying initiation of at least one other event by the user via the entity application, wherein the at least one other event is associated with acquisition of a second resource.

10. The computer program product of claim 9, wherein the computer executable instructions cause the computer processor to perform the steps of:

in response to identifying the initiation of the at least one other event, extracting resource acquisition data associated with the second resource and one or more procedures associated with the acquisition of the second resource; and simulating acquisition of the second resource and generate an outcome based on the user data, resource acquisition data associated with the second resource, and the one or more procedures associated with the acquisition of the second resource.

11. The computer program product of claim 10, wherein the outcome provides information associated with impact of the acquisition of the second resource on the acquisition of the first resource.

12. The computer program product of claim 10, wherein the computer executable instructions cause the computer processor to perform the steps of:

transmitting the outcome to the user device; and transmitting a second set of control signals to display the outcome on the graphical user interface of the user device.

13. The computer program product of claim 12, wherein the computer executable instructions cause the computer processor to perform the steps of displaying the outcome via one or more graphical means.

14. The computer program product of claim 8, wherein the computer executable instructions cause the computer processor to perform the steps of extracting resource acquisition data associated with the acquisition of the first resource from one or more third party entities.

15. A computer implemented method for simulating outcomes for use in navigating procedures for resource acquisition, wherein the method comprises:

identifying initiation of at least one event by a user via an entity application, wherein the at least one event is associated with acquisition of a first resource;

in response to identifying initiation of the at least one event, extracting user data associated with the user;

identifying one or more procedures associated with the acquisition of the first resource;

compiling the user data and the one or more procedures to generate one or more navigational recommendations associated with the acquisition of the first resource;

transmitting the one or more navigational recommendations to a user device of the user; and transmitting a set of control signals to display the one or more navigational recommendations on a graphical user interface of the user device, via the entity application.

16. The computer implemented method of claim 15, wherein the method comprises identifying initiation of at least one other event by the user via the entity application, wherein the at least one other event is associated with acquisition of a second resource.

17. The computer implemented method of claim 16, wherein the method further comprises in response to identifying the initiation of the at least one other event, extracting resource acquisition data associated with the second resource and one or more procedures associated with the acquisition of the second resource; and simulating acquisition of the second resource and generate an outcome based on the user data, resource acquisition data associated with the second resource, and the one or more procedures associated with the acquisition of the second resource.

18. The computer implemented method of claim 17, wherein the outcome provides information associated with impact of the acquisition of the second resource on the acquisition of the first resource.

19. The computer implemented method of claim 17, wherein the method further comprises:

transmitting the outcome to the user device; and transmitting a second set of control signals to display the outcome on the graphical user interface of the user device.

20. The computer implemented method of claim 17, wherein the method further comprises displaying the outcome via one or more graphical means.

\* \* \* \* \*